United States Patent [19]
Klein et al.

[11] Patent Number: 5,924,625
[45] Date of Patent: Jul. 20, 1999

[54] REUSABLE BOX

[75] Inventors: Stephen Klein, Fort Lee, N.J.; James D'Addario, Old Westbury, N.Y.

[73] Assignee: J. D'Addario & Company, Inc., Farmingdale, N.Y.

[21] Appl. No.: 09/002,185

[22] Filed: Dec. 31, 1997

[51] Int. Cl.[6] ..................................................... B65D 5/20
[52] U.S. Cl. .................. 229/103.3; 229/150; 229/198.2
[58] Field of Search .................. 229/103.3, 149, 229/150, 151, 152, 153, 156, 157, 158, 198.2; 206/806

[56] References Cited

U.S. PATENT DOCUMENTS

| | | | |
|---|---|---|---|
| 643,366 | 2/1900 | Stecher | 229/151 |
| 955,880 | 4/1910 | Jager | 229/122 |
| 1,755,375 | 4/1930 | Tanner | 229/164 |
| 2,024,832 | 12/1935 | Myers | 229/157 |
| 2,042,799 | 6/1936 | Ort | 206/806 |
| 2,337,039 | 12/1943 | Gardner, Jr. . | |
| 2,536,948 | 1/1951 | Lehman | 229/150 |
| 2,713,965 | 7/1955 | Acker . | |
| 3,368,735 | 2/1968 | Levi | 229/150 |
| 3,770,187 | 11/1973 | Faires et al. . | |
| 4,265,393 | 5/1981 | Orchard | 229/103.3 |
| 4,560,102 | 12/1985 | Dlugopolski . | |
| 4,572,425 | 2/1986 | Russell . | |
| 5,060,849 | 10/1991 | King | 229/101 |
| 5,570,782 | 11/1996 | Kikuchi et al. | 229/149 |
| 5,624,070 | 4/1997 | Gueniot | 229/155 |
| 5,669,493 | 9/1997 | Focke et al. | 206/271 |

FOREIGN PATENT DOCUMENTS

| | | | |
|---|---|---|---|
| 461652 | 1/1914 | France | 229/157 |
| 1516170 | 3/1968 | France | 229/103.3 |

*Primary Examiner*—Gary E. Elkins
*Attorney, Agent, or Firm*—Hedman, Gibson & Costigan, P. C.

[57] ABSTRACT

A box for packaging products configured to enable the contents of the box to be removed and inspected by a customer without excessive wear and tear on the box and also to enable the display of the box.

6 Claims, 4 Drawing Sheets

REUSABLE BOX

The present invention relates to a box for packaging products configured to enable the contents of the box to be removed and inspected by a customer without excessive wear and tear on the box and also to enable the display of the box.

BACKGROUND OF THE INVENTION

The use of foldable cardboard boxes for shipment and storage of goods is well known. Likewise, the use of boxes with folding flaps to achieve reusability by sparing the box from cutting or tearing is well known, see, e.g., U.S. Pat. No. 2,337,039 to Gardner, U.S. Pat. No. 2,713,965 to Acker and U.S. Pat. No. 3,770,187 to Faires et al., incorporated herein by reference. Typically, these boxes are constructed using various cutout designs wherein the end flaps interlock to close the box. Such designs are uniformly flawed in that repeated use of the cutout end flaps renders the boxes structurally unsound and results in an unattractive and unusable box.

The present invention is a unique box or carton designed to provide a durable, reusable container which resists the wear and tear of repeated openings and closings of the box. The present invention is especially useful in containing goods which are normally closely inspected by customers prior to being purchased, for example, drum heads.

Goods such as drum heads are sold in music stores or specialty stores where the goods are typically displayed on the wall or on a display rack. Often a musician likes to look at and test a drumhead before he or she purchases it and music stores are not only amenable to such inspection but often encourage it. However, repeated opening and closing of the drumhead box for inspection inevitably results in deterioration of the box, especially the closure flaps which are easily torn and dog-eared. In the case of a box that is glued closed, the initial opening of the box results in a deterioration of the appearance of the box which can not be remedied. As a result, customers are inclined to view the goods as damaged based on the ragged appearance of the box and are not disposed to purchase the item, leaving retailers with a difficult item to sell.

The present invention overcomes this problem by providing a box that is resistant to the wear and tear of repeated inspections by a customer. The design of the present invention allows the box to be opened and closed countless times and still retain the structural soundness and aesthetic appearance of a new box. The novel design of the present invention allows the box to be fabricated from lightweight materials such as cardboard without the deterioration normally seen in cardboard boxes.

In addition, the novel design of the present invention allows assembly of the box from a single blank without the use of glue or adhesive, thereby eliminating the cost of a secondary operation and materials for a manufacturer as well as reducing environmental impact. The ability of the present invention to be fabricated from recycled material further reduces environmental impact.

The present invention also is constructed to include a means for hanging the box for display purposes.

OBJECTS OF THE INVENTION

It is therefore an object of the present invention to provide a novel reusable durable box or carton fabricated from ordinary materials such as cardboard that will withstand with minimal deterioration repeated opening and closing of the box.

A further object of the present invention is to provide a novel reusable durable box or carton that is constructed from a single blank of suitable material cut and prescored to facilitate assembly into a shippable container and later modified to a displayable container.

It is still another object of the present invention to provide a novel reusable durable box or carton that can be assembled from a single blank of suitable material without the use of glue or adhesive.

It is another object of the invention to provide a novel reusable durable box that can be fabricated from recycled material.

SUMMARY OF THE INVENTION

Accordingly, the present invention comprises a box or carton formed from a unitary blank of suitable material such as but not limited to recycled or virgin cardboard or folding boxboard, corrugated such as E, B or C flute or plastic having a plurality of score lines facilitating expeditious assembly of the box and cut to provide locking tabs and corresponding slots. Folding the blank along the score lines results in a plurality of panels, and assembly of the box is completed by inserting the tabs into the corresponding slots. The unique design of the present invention enables the box to be completely assembled and structurally sound without the use of glue or adhesive. After assembly, at least one panel of the box is present as a closure flap in an open position to allow insertion of goods. The closure flap is then overlapped over the box and inserted into the main body of the box to effect closure.

BRIEF DESCRIPTION OF THE DRAWINGS

Other objects and advantages of this invention may be seen from the following description when viewed in conjunction with the accompanying drawings wherein.

DESCRIPTION OF THE PREFERRED EMBODIMENT

Figure 1:
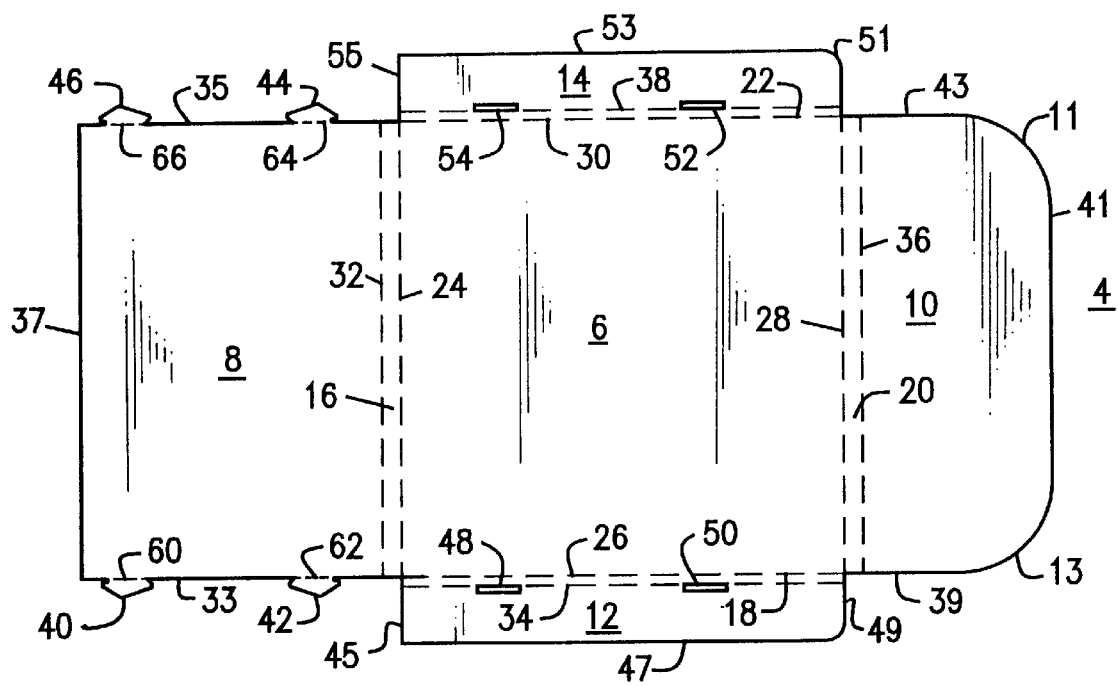
FIG. 1 is a top plan view of a blank for the unfolded box.

As best seen in FIG. 1 an embodiment of the box blank 4 comprises primarily a bottom panel 6, two top panels 8 and 10, two support panels 12 and 14 and four side panels 16, 18, 20 and 22. Dashed lines indicate score lines for folding.

Bottom panel 6 is defined by score lines 24, 26, 28 and 30. Top panel 8 is defined by score line 32 and outer edges 33, 35 and 37 and includes insert tabs 40, 42, 44 and 46. Top panel 10 is defined by score line 36 and edges 39, 41 and 43. Support panel 12 is defined by score line 34 and edges 45, 47 and 49 and support panel 14 is defined by score line 38 and edges 51, 53 and 55. Side panel 16 is defined by score lines 24 and 32 and edges 33 and 35, side panel 18 is defined by score lines 26 and 34 and edges 45 and 49, side panel 20 is defined by score lines 28 and 36 and edges 39 and 43 and side panel 22 is defined by score lines 30 and 38 and edges 51 and 55. Cut lines 48, 50, 52 and 54 are provided for receiving insert tabs 42, 40, 46 and 44 respectively. Cut lines 48 and 50 are formed along score line 34 and cut lines 52 and 54 are formed along score line 38.

Bottom panel 6 can be square or rectangular in shape. Top panels 8 and 10 are substantially equal in width to the width of bottom panel 6, as measured from score line 26 to score line 30. The respective lengths of top panels 8 and 10 are less than the length of bottom panel 6 as measured from score line 24 to score line 28.

Figure 2:
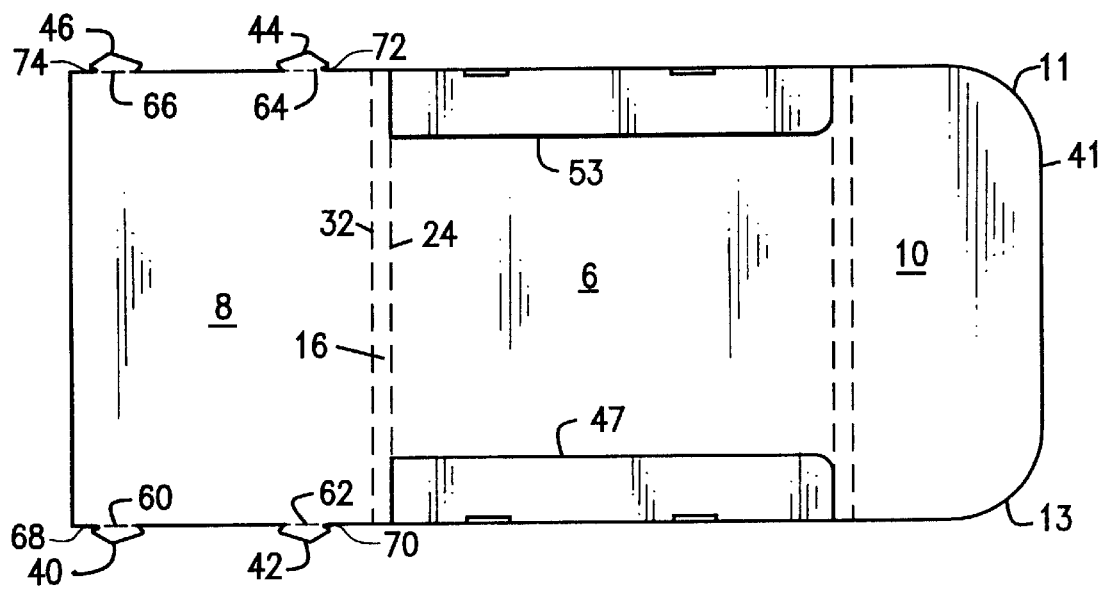
FIG. 2 is a top plan view of the partially folded box.

As best seen in FIGS. 1–4, the box blank 4 is folded along the score lines for assembly. Specifically, as seen in FIGS. 1 and 2, support panels 12 and 14 are folded upwardly and out of the plane of the blank 4 along score lines 34 and 38 respectively. Side panels 18 and 22 are likewise folded upwardly and out of the plane of the blank 4 along score lines 26 and 30 so that support panels 12 and 14 are substantially parallel to bottom panel 6 and side panels 18 and 22 are substantially perpendicular to bottom panel 6 and support panels 12 and 14.

Figure 3:
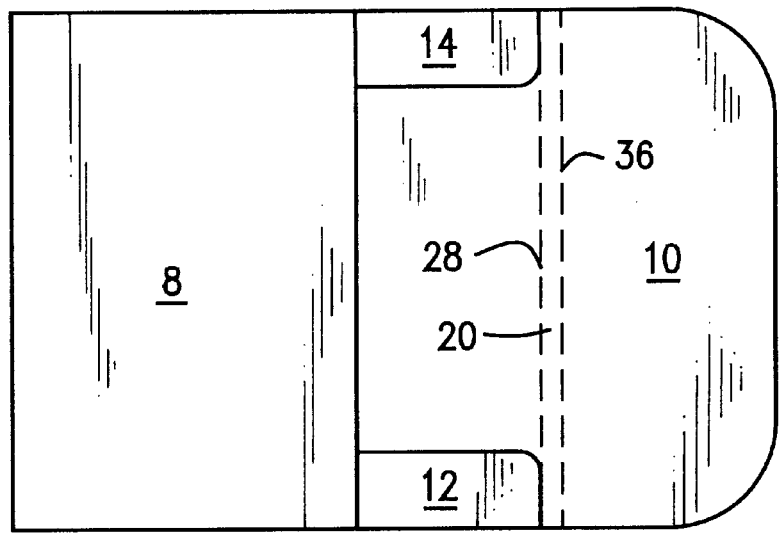
FIG. 3 is a top plan view of the folded box in the open position.

Now referring to FIGS. 2 and 3, top panel 8 is folded upwardly and out of the plane of the blank 4 along score line 32. Insert tabs 40, 42, 44 and 46 are folded upwardly and out of the plane of the blank 4 along score lines 60, 62, 64 and 66 respectively. Side panel 16 is likewise folded upwardly and out of the plane of blank 4 along score line 24 so that top panel 8 is substantially parallel to bottom panel 6 and side panel 16 is substantially perpendicular to bottom panel 6. Insert tabs 42, 40, 46 and 44 are inserted in cut lines 48, 50, 52 and 54 respectively to secure top panel 8 to support panels 12 and 14. The box, as seen in FIG. 3, is now in the assembled, open position wherein a product can be placed in the box.

Figure 4:
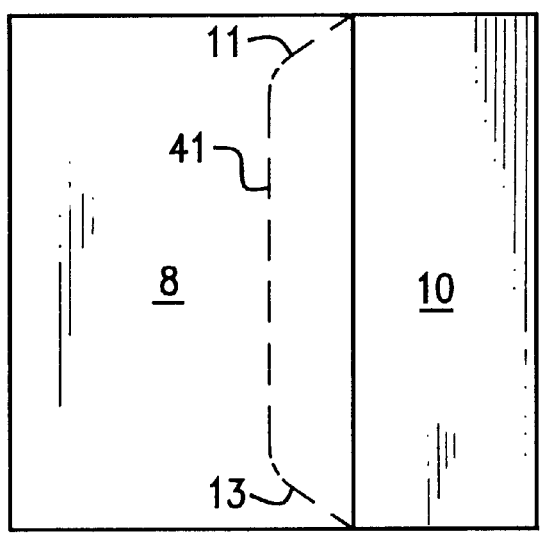
FIG. 4 is a top plan view of the folded box in the closed position.

Now referring to FIGS. 3 and 4, the box is closed by folding upwardly and out of the plane of the blank 4 top panel 10 along score line 36. Side panel 20 is folded upwardly and out of the plane of the blank 4 along score line 28. Top panel 10 is overlapped over support panels 12 and 14 and slidably inserted into a space or slot (not shown) formed between support panels 12 and 14 and top panel 8 as best seen in FIG. 4 wherein the outer edge 41 and corners 11 and 13 of the panel 10 are shown in phantom. Support panels 12 and 14 provide support surfaces for top panel 10 in the closed position. The box is opened by sliding top panel 10 out from said slot formed between said support panels 12 and 14 and top panel 8.

In a preferred embodiment the bottom panel 6 is 14.5 inches square, top panel 8 is 9.875 inches long and 14.5 inches wide, top panel 10 is 6 inches long and 14.5 inches wide, side panels 16, 18, 20 and 22 are each 14.5 inches long and 0.75 inches wide and support panels 12 and 14 are 14.5 inches long and 1.75 inches wide. Cut lines 48, 50, 52 and 54 are 1.5 inches in width and accommodate insert tabs 42, 40, 46 and 44 respectively which measure 1.625 inches in width. As best seen in FIGS. 1, 2, 7a and 7b in this preferred embodiment insert tabs 40 and 46 further comprise notched cutouts 68 and 74 on the side of the tab proximal to edge 37 and insert tabs 42 and 44 further comprise notched cutouts 70 and 72 proximal to score line 32. In this embodiment the notched cutouts 68, 70, 72 and 74 facilitate the sliding of the tabs 40, 42, 44 and 46 into cut lines 50, 48, 54 and 52, respectively and create a locking engagement of top panel 8 to support panels 12 and 14. In this embodiment cut lines 48 and 50 are spaced 4.375 inches apart and cut lines 52 and 54 are spaced 4.375 inches apart. The top panel 10 is provided with rounded edges 11 and 13 to facilitate insertion under the panel 8 when in the closed assembled condition as best seen in FIG. 4. In this embodiment the box is especially suitable for containing drumheads.

Figure 6:
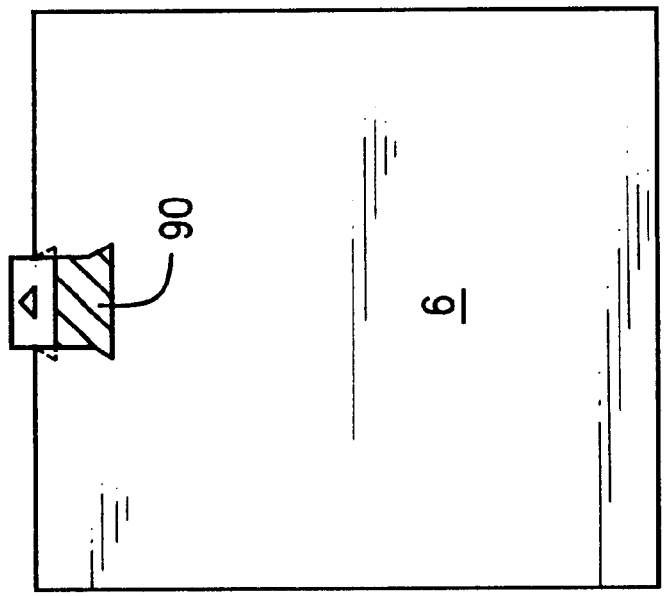
FIG. 6 is a bottom plan view of a preferred embodiment of the box wherein the means for hanging the box is in the assembled stage.
Figure 5:
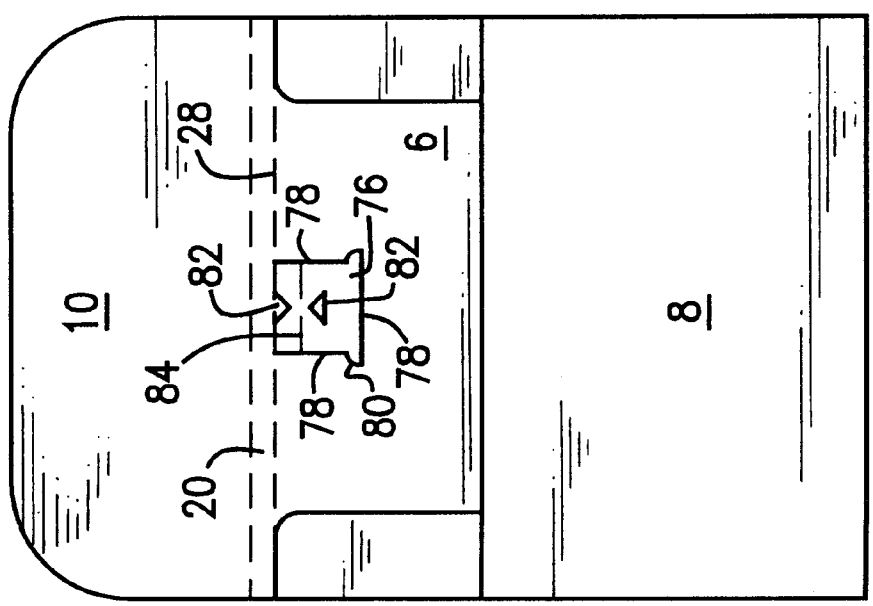
FIG. 5 is a top plan view of a preferred embodiment of the box further comprising a means for hanging the box wherein the means for hanging the box is in the unassembled stage.
Figure 7A:
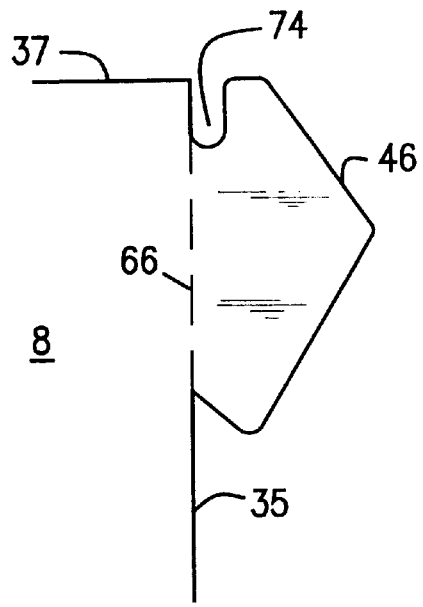
FIG. 7a is a top plan view of a preferred embodiment of one of the locking tabs.
Figure 7B:
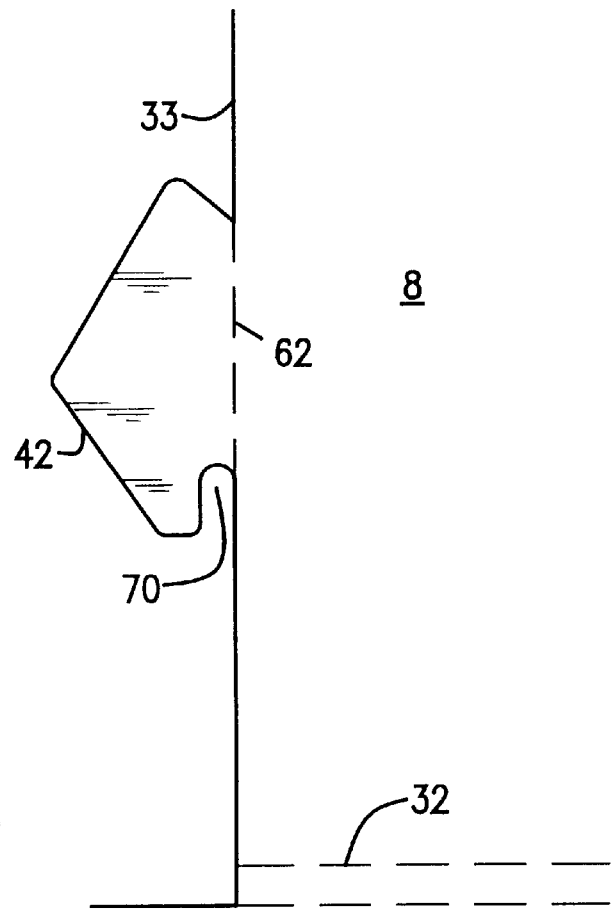
FIG. 7b is a top plan view of a preferred embodiment of one of the locking tabs.

The box may further comprise a means for hanging the box on a display rack or wall. Any means for hanging a display item known in the art is suitable for use with the present invention. Now referring to FIGS. 5 and 6, in a most preferred embodiment the means for hanging the box on a display rack or wall comprises a hanger 76 defined by a perforated border 78 formed in bottom panel 6 and score line 28, said perforated border facilitating separation of the hanging means from the bottom panel 6 and said score line 28 enabling attachment of hanger 76 to the box. Hanger 76 further comprises wide portion 80, two cutout portions 82 and score line 84. To deploy hanger 76, hanger 76 is pushed inwardly toward the plane of the box from the back of the bottom panel 6 and separated along perforated border 78 so that wide portion 80 is inside the box. Hanger 76 is then folded along score lines 82 and 84 by sliding said hanger upwardly toward side panel 20. In this manner cutout portions 82 are superimposed on each other providing a space for accommodating a peg, hook or the like. The edges of the wide portion 80 are inserted in the opening 90 formed in bottom panel 6 when the hanger 76 is removed from the bottom panel 6 whereby the extensions of the wide portion 80 bear against the inside surface of the panel 6 to brace the hanger 76 as it extends from the side panel 20, thus forming a hanging means. In this most preferred embodiment the box is constructed of recycled material.

From the foregoing, it is seen that this invention is one well adapted to attain all the ends and objectives hereinabove set forth together with other advantages which are inherent in the structure. Variations of the present invention will suggest themselves to those skilled in the art in light of the above-detailed description. All such variations and modifications are within the full intended scope of the appended claims.

What is claimed is:

1. A durable box comprising:

a single blank having a plurality of score lines and cut lines defining a plurality of panels, said panels being folded along said score lines to define a box structure comprising a bottom, four side walls, two support walls extending from two of said opposed side walls, said support walls being folded inwardly of the box structure and substantially toward each other, two top walls extending from the two side walls adjacent to said side walls from which the support walls extend, said top walls being folded inwardly and substantially toward each other to overlap one over the other, and means for releasably securing one of said top walls to said support walls comprised of two sets of oppositely notched insert tabs formed on the edges of one of said top walls and two sets of tab-receiving slots on the connection between the support walls and the side walls from which the support walls extend said insert tabs inserted into said slots to secure the box, wherein the assembled box comprises a slot between said support walls and said releasably secured top wall in which slot the second of said top walls is slidably received in said slot.

2. A durable box according to claim 1 wherein the second of said top walls comprises at least one curved edge.

3. A durable box according to claim 1 further comprising a means for hanging said box.

4. A durable box according to claim 3 wherein said means for hanging said box comprises a hanger defined by a perforated line and a score line formed in the bottom of the blank, said hanger separable along the perforated line and attached to said blank along said score line.

5. A durable box according to claim 1 wherein said blank is cardboard.

6. A durable box according to claim 1 wherein said blank is made from recycled material.

* * * * *